(12) United States Patent
Gysling

(10) Patent No.: US 7,150,202 B2
(45) Date of Patent: Dec. 19, 2006

(54) METHOD AND APPARATUS FOR MEASURING CHARACTERISTICS OF CORE-ANNULAR FLOW

(75) Inventor: Daniel L. Gysling, Glastonbury, CT (US)

(73) Assignee: CiDRA Corporation, Wallingford, CT (US)

( * ) Notice: Subject to any disclaimer, the term of this patent is extended or adjusted under 35 U.S.C. 154(b) by 0 days.

(21) Appl. No.: 10/887,075

(22) Filed: Jul. 8, 2004

(65) Prior Publication Data

US 2005/0033545 A1 Feb. 10, 2005

Related U.S. Application Data

(60) Provisional application No. 60/486,409, filed on Jul. 8, 2003, provisional application No. 60/563,033, filed on Apr. 16, 2004.

(51) Int. Cl.
*G01F 1/34* (2006.01)
*G01F 1/00* (2006.01)

(52) U.S. Cl. .................. 73/861.42; 702/45
(58) Field of Classification Search ............ 73/861.42, 73/861.44, 861.08; 702/45
See application file for complete search history.

(56) References Cited

U.S. PATENT DOCUMENTS

| | | | |
|---|---|---|---|
| 4,048,853 A | 9/1977 | Smith et al. ............. 73/861.25 |
| 4,080,837 A | 3/1978 | Alexander et al. ......... 73/61.45 |
| 4,248,085 A | 2/1981 | Coulthard ................ 73/861.06 |
| 4,445,389 A | 5/1984 | Potzick et al. ........... 73/861.27 |
| 4,896,540 A | 1/1990 | Shakkottai et al. ....... 73/861.02 |
| 5,040,415 A | 8/1991 | Barkhoudarian ......... 73/861.03 |
| 5,083,452 A | 1/1992 | Hope ........................ 73/61 R |
| 5,218,197 A | 6/1993 | Carroll .................. 250/227.19 |
| 5,285,675 A | 2/1994 | Colgate et al. ............. 73/23.2 |
| 5,367,911 A | 11/1994 | Jewell et al. ............ 73/861.08 |
| 5,398,542 A | 3/1995 | Vasbinder ................... 73/40.5 |
| 5,524,475 A | 6/1996 | Kolpak et al. ............. 73/19.03 |
| 5,526,844 A | 6/1996 | Kamen et al. ......... 137/614.11 |
| 5,591,922 A | 1/1997 | Segeral et al. ........... 73/861.04 |
| 5,708,211 A | 1/1998 | Jepson et al. |
| 5,741,980 A | 4/1998 | Hill et al. ................ 73/861.04 |

(Continued)

FOREIGN PATENT DOCUMENTS

EP 0 684 458 11/1995

(Continued)

OTHER PUBLICATIONS

"Noise and Vibration Control Engineering Principles and Applications", Leo L. Beranek and Istvan L. Ver, A. Wiley Interscience Publication, pp. 537-541, Aug. 1992.

(Continued)

*Primary Examiner*—Harshad Patel

(57) ABSTRACT

An apparatus and method are disclosed wherein at least one parameter associated with a core-annular flow (CAF) in a pipe is measured by sensing unsteady pressures associated with undulations formed at the interface of a core region and an annular region in the CAF at different axial locations along the pipe. The at least one parameter, which may include a flow velocity of the CAF, Mach number associated with the CAF, and a volumetric flow rate of the CAF, is determined using sensed unsteady pressures. The CAF may be developed from a shear thinning fluid, such as bitumen froth or from a wood pulp fiber suspension. Alternatively, the CAF may be developed from a lubricating fluid, such as water, and a fluid to be transported, such as oil, where the fluid to be transported forms the core region and the lubricating fluid forms the annular region.

36 Claims, 7 Drawing Sheets

U.S. PATENT DOCUMENTS

| | | | |
|---|---|---|---|
| 5,770,805 A | 6/1998 | Castel | 73/861.04 |
| 5,770,806 A | 6/1998 | Hiismaki | 73/861.29 |
| 5,835,884 A | 11/1998 | Brown | 73/861.04 |
| 5,845,033 A | 12/1998 | Berthold et al. | 385/12 |
| 5,948,959 A | 9/1999 | Peloquin | 73/1.83 |
| 6,151,958 A | 11/2000 | Letton et al. | 73/61.79 |
| 6,202,494 B1 | 3/2001 | Riebel et al. | 73/861.29 |
| 6,354,147 B1 * | 3/2002 | Gysling et al. | 73/61.79 |
| 6,378,357 B1 | 4/2002 | Han et al. | 73/54.41 |
| 6,435,030 B1 | 8/2002 | Gysling et al. | 73/587 |
| 6,443,226 B1 | 9/2002 | Diener et al. | |
| 6,450,037 B1 | 9/2002 | McGuinn et al. | |
| 6,463,813 B1 | 10/2002 | Gysling | 73/862.59 |
| 6,536,291 B1 | 3/2003 | Gysling et al. | 73/861.42 |
| 6,550,342 B1 | 4/2003 | Croteau et al. | 73/800 |
| 6,558,036 B1 | 5/2003 | Gysling et al. | |
| 6,587,798 B1 | 7/2003 | Kersey et al. | 702/50 |
| 6,601,458 B1 | 8/2003 | Gysling et al. | 73/861.04 |
| 6,609,069 B1 | 8/2003 | Gysling | 702/48 |
| 6,655,221 B1 | 12/2003 | Aspelund et al. | |
| 6,691,584 B1 | 2/2004 | Gysling et al. | 73/861.42 |
| 6,698,297 B1 | 3/2004 | Gysling | |
| 6,732,575 B1 | 5/2004 | Gysling et al. | 73/61.79 |
| 6,782,150 B1 | 8/2004 | Davis et al. | 385/12 |
| 6,813,962 B1 | 11/2004 | Gysling et al. | 73/861.26 |
| 6,837,098 B1 | 1/2005 | Gysling et al. | 73/61.79 |
| 6,862,920 B1 | 3/2005 | Gysling et al. | |
| 6,868,737 B1 | 3/2005 | Croteau et al. | |
| 6,889,562 B1 | 5/2005 | Gysling et al. | |
| 6,898,541 B1 | 5/2005 | Gysling et al. | |
| 6,959,604 B1 | 11/2005 | Bryant et al. | |
| 6,971,259 B1 | 12/2005 | Gysling | |
| 6,988,411 B1 | 1/2006 | Gysling et al. | |
| 7,032,432 B1 | 4/2006 | Gysling et al. | |
| 2002/0123852 A1 | 9/2002 | Gysling et al. | |
| 2002/0129662 A1 | 9/2002 | Gysling et al. | |
| 2003/0136186 A1 | 7/2003 | Gysling et al. | |
| 2003/0154036 A1 | 8/2003 | Gysling et al. | |
| 2004/0069069 A1 | 4/2004 | Croteau | |
| 2004/0074312 A1 | 4/2004 | Gysling | |
| 2004/0144182 A1 | 7/2004 | Gysling et al. | |
| 2004/0167735 A1 | 8/2004 | Gysling et al. | |
| 2004/0194539 A1 | 10/2004 | Gysling | |
| 2004/0199340 A1 | 10/2004 | Gysling et al. | |
| 2004/0210404 A1 | 10/2004 | Gysling et al. | |
| 2004/0226386 A1 * | 11/2004 | Gysling et al. | 73/861.42 |
| 2004/0231431 A1 | 11/2004 | Bailey et al. | |
| 2004/0255695 A1 | 12/2004 | Gysling et al. | |
| 2005/0005711 A1 | 1/2005 | Curry et al. | |
| 2005/0005713 A1 * | 1/2005 | Winston et al. | 73/861.42 |
| 2005/0005912 A1 | 1/2005 | Gysling et al. | |
| 2005/0005913 A1 | 1/2005 | Curry et al. | |
| 2005/0011258 A1 | 1/2005 | Didden et al. | |
| 2005/0011283 A1 * | 1/2005 | Gysling et al. | 73/861.44 |
| 2005/0011284 A1 * | 1/2005 | Gysling et al. | 73/861.44 |
| 2005/0012935 A1 | 1/2005 | Kersey | |
| 2005/0033545 A1 * | 2/2005 | Gysling | 702/138 |
| 2005/0039520 A1 | 2/2005 | Bailey et al. | |
| 2005/0044929 A1 | 3/2005 | Banach et al. | |
| 2005/0044966 A1 | 3/2005 | Croteau et al. | |
| 2005/0050956 A1 | 3/2005 | Croteau et al. | |
| 2005/0072216 A1 | 4/2005 | Engel | |
| 2005/0120799 A1 | 6/2005 | Gysling et al. | |
| 2005/0125166 A1 | 6/2005 | Loose et al. | |
| 2005/0125169 A1 | 6/2005 | Loose | |
| 2005/0125170 A1 * | 6/2005 | Gysling et al. | 702/48 |
| 2005/0159904 A1 | 7/2005 | Loose et al. | |
| 2005/0171710 A1 | 8/2005 | Gysling et al. | |
| 2005/0246111 A1 * | 11/2005 | Gysling et al. | 702/45 |
| 2006/0037385 A1 | 2/2006 | Gysling | |
| 2006/0048583 A1 | 3/2006 | Gysling | |
| 2006/0053809 A1 | 3/2006 | Gysling et al. | |

FOREIGN PATENT DOCUMENTS

| | | |
|---|---|---|
| WO | WO 93/14382 | 7/1993 |
| WO | WO 99/067629 | 12/1999 |
| WO | WO 00/060317 | 10/2000 |
| WO | WO 01/002810 | 1/2001 |

OTHER PUBLICATIONS

"Two Decades of Array Signal Processing Research", The Parametric Approach, H. Krim and M. Viberg, IEEE Signal Processing Magazine, Jul. 1996, pp. 67-94.

"Development of an array of pressure sensors with PVDF film, Experiments in Fluids 26", Jan. 8, 1999, Springer-Verlag.

"Viscous Attenuation of Acoustic Waves in Suspensions" by R.L. Gibson, Jr. and M.N. Toksoz.

Kohei Ogawa et al: "Flow Characteristics and Circular Pipe Flow of Pulp-Supension" Journal of Chemical Engineering of Japan vol. 23, No. 1, Feb. 1990 pp. 1-6.

Runyuan Bai et al: "Lubricated Pipelining: Stability of Core-Annular Flow" Journal of Fluid Mechanics, vol. 240, Jul. 1992, pp. 97-132.

Daniel D. Joseph et al: "Self-Lubricated Transport of Bitumen Froth" Journal of Fluid Mechanics, vol. 386, May 10, 1999, pp. 127-148.

Prof DR SC Nat Otto Fiedler: "Stromungs-und Durchflussemesstechnik" 1992, Roldenburg Verlag Munchen Wien, Munchen, DE, XP002326383 p. 344-355.

Sonar-Based Volumetric Flow Meter for Pulp and Paper Applications — By: Daniel L. Gysling & Douglas H. Loose — Dec. 13, 2002.

Sonar Based Volumetric Flow Meter for Chemical and Petrochemical Applications — By: Daniel L. Gysling & Douglas H. Loose — Feb. 14, 2002.

Sonar Based Volumetric Flow and Entrained Air Measurement for Pulp and Paper Applications — By: Daniel L. Gysling & Douglas H. Loose — Jan. 24, 2003.

* cited by examiner

METHOD AND APPARATUS FOR MEASURING CHARACTERISTICS OF CORE-ANNULAR FLOW

CROSS-REFERENCE TO RELATED APPLICATIONS

The present application claims the benefit of U.S. Provisional Patent Application No. 60/486,409 (CiDRA Docket No. CC-0636) filed Jul. 8, 2003 and U.S. Provisional Patent Application No. 60/563,033 (CiDRA Docket No. CC-0736) filed Apr. 16, 2004, which are incorporated by reference herein in their entirety.

TECHNICAL FIELD

This invention relates to a method and apparatus for measuring at least one parameter associated with a core-annular flow within a pipe, and more particularly to a method and apparatus for measuring at least one parameter such as flow velocity and/or volumetric flow rate associated with a core-annular flow within a pipe using array processing techniques.

BACKGROUND

Core-annular flow (CAF) through a pipe is characterized by a fluid or mixture disposed at the center or core of the flow, known as the core region, and a relatively low viscosity fluid or mixture disposed about the core region between the core region and the walls of the pipe, known as the annular region. A phenomenon associated with CAF is that the lower viscosity annular region naturally migrates to the high sheer region found at the wall of the pipe where it acts to levitate the core region off of the pipe wall and lubricate the flow.

One example of CAF is found in the oilsands processing industry, where bitumen is extracted from mined oilsand as bitumen froth using a hot water extraction process. Bitumen is the primary component in bitumen froth, which typically contains about 50–60% bitumen, about 30–40% water, and about 10% fine solids and clays. The challenge in transporting bitumen through pipelines is derived from its high static viscosity, on the order of $10^5$ times that of water at standard conditions. If bitumen froth behaved as a Newtonian fluid, i.e. the shear stress was strictly proportional to shear rate, pumping bitumen froth would require several orders of magnitude more power than that required to pump water, rendering pipeline transfer impractical.

Fortunately, bitumen froth is a shear thinning fluid. The viscosity of these types of non-Newtonian fluids decreases with increasing shear rate. Shear thinning fluids tend to exhibit CAF regimes, in which the motion of the fluid through the pipe set ups an essentially rigid, core region in the center of the pipe, surrounded by a highly-sheared, less-viscous annular region which effectively lubricates the core flow. From an operational perspective, the primary result of this self-lubrication of bitumen froth (often termed Natural Froth Lubricity or NFL) is a significant reduction (several orders of magnitude) in the pressure drop required to pump a given amount of bitumen froth compared to that predicted by a model using the static viscosity and Newtonian model of the fluid rheology.

Another example of the application of CAF is found in the so-called core-annular lubricated pipelining of oil, where a fluid such as water is added to the flow of oil to create a CAF with the oil forming the core region and the water forming the annular region. Water lubricated pipelining was applied, for example, in the 24 mile long pipeline from North Midway Sunset Reservoir near Bakersfield, Calif., to the central facilities at Ten Section. In this pipeline, oil was lubricated by water (including sodium at about 0.6 wt %) at a volume flow rate of 30% of the total. It is reported that CAF was stable as long as the flow velocity was at least 0.9 meters per second.

The CAF regime of bitumen froth and core-annular lubricated oil flow are described in articles entitled "Steady Flow and Interfacial Shapes of a Highly Viscous Dispersed Phase, by Runyuan Bai, Daniel D. Joseph, in International Journal of Multiphase Flow (2000), vol. 26, pp. 1469–1491; "Self-Lubricated Transport of Bitumen Froth" by Daniel Joesph, Runyan Bai, Clara Mata, Ken Sury, Chris Grant, in J. Fluid Mech. (1999), vol. 286, pp. 127–148; and "Multiphase Pipelining", by Daniel Joseph, in Proposal to the Department of Energy, Office of Basic Energy Sciences, Division of Engineering, December 2000, all of which are incorporated herein by reference.

Another example of the application of CAF is found in the paper pulp industry, which relies on large-diameter-pipe conveyed slurries to transport pulp throughout the process of papermaking. It has been recognized that the suspension flow behavior of wood pulp fiber is directly related to the flocculation tendency of the constituent fibers. The entanglement of fibers and subsequent floc formation and development of fiber networks gives fiber suspensions unique flow mechanisms not encountered in other particulate solid suspensions.

Fiber suspension flow can be characterized broadly by three different flow regimes: plug flow, transition flow, and turbulent flow. Each regime can be further divided into subregimes with well-defined shear mechanisms. There are four major regimes of plug flow. At the lowest flow rates, friction loss is independent of velocity, and fiber-plug-wall (solid-solid) friction dominates. As flow rate increases, the shear rate is sufficient to force the protruding flocs back into the plug surface to produce a smoother plug. In so doing, a CAF develops wherein a water annular region in laminar shear develops around the fiber plug core region, and the friction loss decreases. As small scale turbulence in the thin peripheral layer onsets, shear stresses begin removing the fibers from the plug permanently. The transition from plug flow to turbulent flow starts as the plug diminishes in size and a turbulent fiber-floc-water annular region develops. Pipe friction loss is reduced further below water alone. The point of maximum drag reduction is reached in the transition flow regime where a fiber plug core region approximately 20% of the pipe diameter still exists. The suspension finally reaches fully developed turbulence where there is no central plug.

The characteristics of this type of CAF is described in the following articles, which are incorporated herein by reference; "Modeling Fiber Flocculation in Turbulent Flow: a numerical Study" by Morten Steen, September 1991 Tappi Journal, pp. 175–182; "Characterization of Pulp Suspensions", by Robert Powell, Sitram Ramaswamy, Matthew Weldon, Michael McCarthy, 1996 Engineering Conference, pp. 525–533; "New Insights into the Flow of Pulp Suspensions", by Torsten Paul, Geoff Duffy, Dong Chen, 2001 Tappi Peer-Reviewed Paper, Sept 2001 vol1: No. 1; "Pressure Loss and Velocity Profile of Pulp Flow in a Circular Pipe", by Kohei Ogawa, Shiro Yoshikawa, Jun Ikeda, Hirohisa Ogawa, April 1990 Tappi Juornal, pp. 217–221.

Historically, obtaining accurate and reliable measurements of CAF has proven technically difficult and economically challenging. Firstly, CAF flows may be extremely abrasive. For example, some bitumen froth flows contain >50% solids by mass with particle distributions ranging from several microns up to several inches in diameter. These flows typically exhibit some level of stratification, as evidenced by the preferential wear of the lower portion of the pipelines in which they are transported, requiring the pipes to be rotated on a periodic basis. The presence of ~10% by volume of non-conductive bitumen further complicates the flow measurement, as does the possibility of the pipe containing up to several percent of entrained air by volume.

Currently, modified venturi (or wedge) meters are the predominant devices used to measure flow rates in pipelines transporting CAF. Mechanical wear of these meters results in high maintenance, calibration, and replacement costs, providing an incentive for operators to evaluate alternative measurement technologies.

In addition, these meters are invasive. That is, they are installed such that they extend through piping into contact with the fluid in the flow process. As a result, installation or maintenance of the meter often requires at least a portion of the flow process to be isolated. Therefore, it is desirable to have a meter that is easily installed.

One attempt to measure velocity profiles of wood pulp suspensions through pipe using a non-invasive method is described Tie-Quiang Li, et al., in "Velocity measurements of fiber suspensions in pipe flow by the nuclear magnetic resonance imaging method", Tappi Journal Vol. 77, No. 3. As implied by its title, this paper describes the application of nuclear magnetic resonance imaging (NMRI) to observe the flow of cellulose fiber suspensions in pipes. While the use of NMRI was shown to be successful in characterizing velocity, the use of NMRI equipment may be economically challenging for many applications.

Thus, there remains a need for a convenient and economical apparatus for obtaining accurate, and reliable measurements of the characteristics of CAF.

SUMMARY OF THE INVENTION

The above-described needs are met by a method and apparatus for measuring at least one parameter associated with core-annular flow in a pipe. The apparatus comprises a spatial array of at least two sensors disposed at different axial locations along the pipe and a signal processor.

Each of the at least two sensors provides a pressure signal indicative of unsteady pressure within the pipe at a corresponding axial location of the pipe. The unsteady pressure is associated with undulations formed at the interface of a core region and an annular region in the core-annular flow. The signal processor is configured to determine the at least one parameter using the pressure signals. The at least one parameter may include one or more of: a flow velocity of the core-annular flow, Mach number associated with the core annular flow, and a volumetric flow rate of the core annular flow. At least one of the sensors may measure strain on the pipe. The core-annular flow may be developed from a shear thinning fluid, such as bitumen froth. Alternatively, the core-annular flow may be developed from a lubricating fluid, such as water, and a fluid to be transported, such as oil, where the fluid to be transported forms the core region and the lubricating fluid forms the annular region. Alternatively, the core-annular flow is developed from a wood pulp fiber suspension.

In various embodiments, the signal processor is further configured to: process the pressure signals to define a convective ridge in the k-ω plane; and determine the slope of at least a portion of the convective ridge to determine a flow velocity of the core-annular flow. The signal processor may further be configured to: determine a cross-sectional area of the pipe; and determine the volumetric flow rate of the core-annular flow using the cross-sectional area and the flow velocity of the core-annular flow.

In another aspect of the invention, a method for measuring at least one parameter associated with a core-annular flow in a pipe comprises: sensing unsteady pressures associated with undulations formed at the interface of a core region and an annular region in the core-annular flow at different axial locations along the pipe to provide signals indicative of the unsteady pressures; and determining the at least one parameter using the signals indicative of the unsteady pressures. The at least one parameter includes at least one of: a flow velocity of the core-annular flow, Mach number associated with the core annular flow, and a volumetric flow rate of the core annular flow. Sensing the unsteady pressures may include measuring strain on the pipe.

The core-annular flow may be developed from a shear thinning fluid, such as bitumen froth. Alternatively, the core-annular flow may be developed from a lubricating fluid, such as water, and a fluid to be transported, such as oil, where the fluid to be transported forms the core region and the lubricating fluid forms the annular region. Alternatively, the core-annular flow is developed from a wood pulp fiber suspension.

Determining the at least one parameter may include: processing the signals indicative of the unsteady pressures to define a convective ridge in the k-ω plane; and determining the slope of at least a portion of the convective ridge to determine a flow velocity of the core-annular flow. Determining the at least one parameter may include: determining a cross-sectional area of the pipe; and determining the volumetric flow rate of the core-annular flow using the cross-sectional area and the flow velocity of the core-annular flow.

The foregoing and other objects, features and advantages of the present invention will become more apparent in light of the following detailed description of exemplary embodiments thereof.

BRIEF DESCRIPTION OF THE DRAWINGS

Referring now to the drawing wherein like elements are numbered alike in the various Figures.

DETAILED DESCRIPTION

Figure 1:
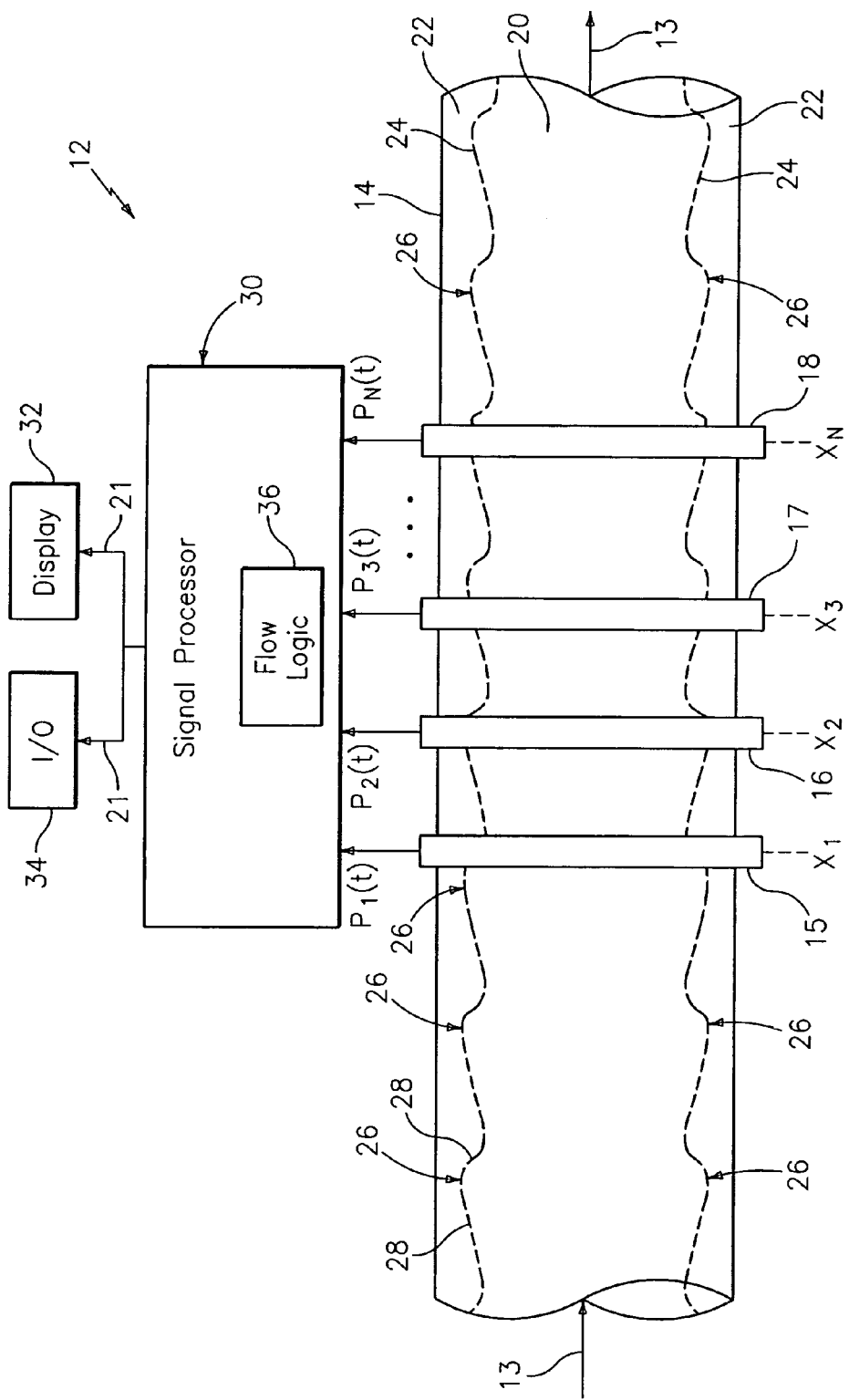
FIG. 1 is a schematic diagram of an apparatus for measuring at least one parameter associated with a core-annular flow within a pipe using array processing techniques.

Referring to FIG. 1, an apparatus (flow meter) 12 for measuring at least one parameter associated with a core-annular flow (CAF) 13 in a pipe 14 is shown. The apparatus 12 comprises a spatial array of sensors 15–18 disposed at different axial locations $X_1$–$X_N$ along the pipe 14. While four sensors 15–18 are shown, it is contemplated that two or more sensors may be used. Each of the sensors 15–18 outputs a pressure signal $P_1(t)$–$P_N(t)$, respectively, which is indicative of unsteady pressure within the pipe 14 at a corresponding axial location $X_1$–$X_N$ of the pipe 14.

The CAF 13 is characterized by a fluid or mixture disposed at the center or core of the flow, the core region 20, and a relatively low viscosity fluid or mixture, the annular region 22, which is disposed about the core region 20 between the core region 20 and the walls of the pipe 14. The relatively low viscosity fluid or mixture forming the annular region 22 naturally migrates to the high sheer region found at the wall of pipe 14.

It has been surprisingly found that CAF 13, which does not exhibit large scale coherent structures (e.g., vortices or eddies) associated with turbulent fluid flow, exhibits a self-generated, coherent unsteady pressure field that can be sensed by the array of sensors 15–18 to determine parameters of the CAF 13 such as flow velocity, volumetric flow rate and Mach number. These unsteady pressures are associated with undulations 26 (also known as waves, bamboo waves, tiger waves, and wavy core-annular flow) formed at the interface 24 of the core region 22 and the annular region 24 in the CAF 13.

As depicted in FIG. 1, the undulations 26 along the interface 24 form a "bamboo" shape, which has been attributed to a pressure field wherein high pressure at a front portion 28 of each undulation crest steepens the interface 24 and low pressure at a back portion 28 of each undulation crest makes the interface 24 less steep. The pressure field associated with the undulations 26 is coherent over several pipe diameters and moves with the CAF 13. While not wanting to be bound by theory, it is believed that as this pressure field moves with the CAF 13 through the array of sensors 15–18, the pressure field creates the unsteady pressures sensed by the array of sensors 15–18. Thus, although core-annular flows are not considered to be turbulent in the classical sense, they do exhibit a self-generated, coherent pressure field that can be sensed by the array of sensors 15–18 to determine parameters of the CAF 13 such as flow velocity, volumetric flow rate and Mach number, using array-processing techniques, as will be described in further detail hereinafter.

The CAF 13 may be developed from a shear thinning fluid. The viscosity of these types of non-Newtonian fluids decreases with increasing shear rate. Shear thinning fluids tend to exhibit CAF regimes, in which the motion of the fluid through the pipe set ups an essentially rigid, core region 20 in the center of the pipe 14, surrounded by a highly-sheared, less-viscous annular region 22 which effectively lubricates the core flow. Examples of shear thinning fluids include ketchup and other processed foods, water borne latex paints, blood, film emulsions, nail polish, and some plastics.

Figure 2B:
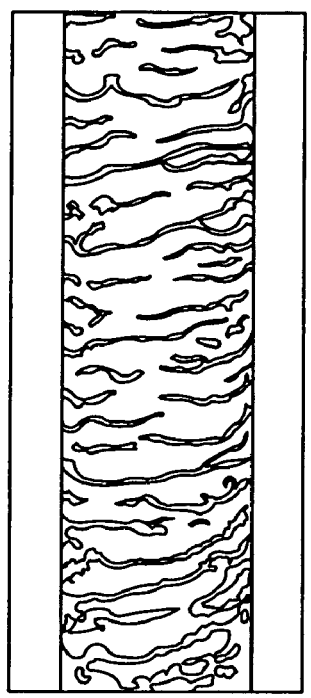
FIGS. 2a and 2b illustrate side views of core-annular flow depicting tiger waves of bitumen froth in water with colloidal clay.
Figure 2A:
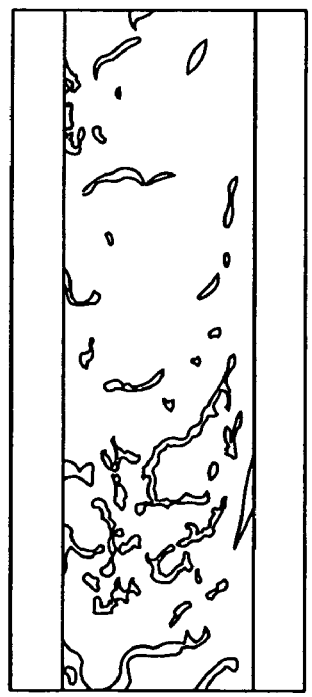

Another example of a shear thinning fluid is found in the oilsands processing industry, where bitumen is extracted from mined oilsand as bitumen froth using a hot water extraction process. Bitumen is the primary component in bitumen froth, which typically contains about 50–60% bitumen, about 30–40% water, and about 10% fine solids and clays. FIGS. 2a and 2b depict visual patterns in bitumen froth operating in Natural Froth Lubricity (NFL) as observed in laboratory studies using clear wall pipe sections. These patterns, often termed "tiger waves", are formed in a water/clay mixture that is released at the pipe wall to form the annular region 22 of the CAF 13. The water/clay mixture is opaque except where the released water layer is thin at the crests of the undulations 26.

Referring again to FIG. 1, the CAF 13 may alternatively be developed by the addition of a lubricating fluid to a fluid to be transported, as is found in the so-called annular lubricated pipelining of oil where a fluid such as water is added to the flow of oil to create a CAF for facilitating the transfer of the oil. In such CAF regimes, the fluid to be transported forms the core region 20 and the lubricating fluid forms the annular region 22.

The CAF regime of bitumen froth and core-annular lubricated oil flow are described, for example, in articles entitled "Steady Flow and Interfacial Shapes of a Highly Viscous Dispersed Phase, by Runyuan Bai, Daniel D. Joseph, in International Journal of Multiphase Flow (2000), vol. 26, pp. 1469–1491; "Self-Lubricated Transport of Bitumen Froth" by Daniel Joesph, Runyan Bai, Clara Mata, Ken Sury, Chris Grant, in J. Fluid Mech. (1999), vol. 286, pp. 127–148; and "Multiphase Pipelining", by Daniel Joseph, in Proposal to the Department of Energy, Office of Basic Energy Sciences, Division of Engineering, December 2000, all of which are incorporated herein by reference.

Alternatively, the CAF 13 may be developed from a wood pulp fiber suspension. The paper pulp industry relies on large-diameter-pipe conveyed slurries to transport pulp throughout the process of papermaking. It has been recognized that the suspension flow behavior of wood pulp fiber is directly related to the flocculation tendency of the constituent fibers. The entanglement of fibers and subsequent floc formation and development of fiber networks gives fiber suspensions unique flow mechanisms not encountered in other particulate solid suspensions.

Fiber suspension flow can be characterized broadly by three different flow regimes: plug flow, transition flow, and turbulent flow. Each regime can be further divided into subregimes with well-defined shear mechanisms. There are four major regimes of plug flow. At the lowest flow rates, friction loss is independent of velocity, and fiber-plug-wall (solid-solid) friction dominates. As flow rate increases, the shear rate is sufficient to force the protruding flocs back into the plug surface to produce a smoother plug. In so doing, a CAF develops wherein a water annular region 22 in laminar shear develops around the fiber plug core region 20, and the friction loss decreases. As turbulence in the thin peripheral layer onsets, shear stresses begin removing the fibers from the plug permanently. The transition from plug flow to turbulent flow starts as the plug diminishes in size and a turbulent fiber-floc-water annular region 22 develops. Pipe friction loss is reduced further below water alone. The point of maximum drag reduction is reached in the transition flow regime where a fiber plug core region 20 approximately 20% of the pipe inside diameter still exists. The suspension finally reaches fully developed turbulence where there is no central plug.

The characteristics of this type of CAF is described, for example, in the following articles, which are incorporated herein by reference; "Modeling Fiber Flocculation in Turbulent Flow: a numerical Study" by Morten Steen, September 1991 Tappi Journal, pp. 175–182; "Characterization of Pulp Suspensions", by Robert Powell, Sitram Ramaswamy, Matthew Weldon, Michael McCarthy, 1996 Engineering Conference, pp. 525–533; "New Insights into the Flow of Pulp Suspensions", by Torsten Paul, Geoff Duffy, Dong Chen, 2001 Tappi Peer-Reviewed Paper, Sept 2001/Vol1: No. 1; "Pressure Loss and Velocity Profile of Pulp Flow in a Circular Pipe", by Kohei Ogawa, Shiro Yoshikawa, Jun Ikeda, Hirohisa Ogawa, April 1990 Tappi Juornal, pp. 217–221.

The pressure signals $P_1(t)$–$P_N(t)$ provided by each respective pressure sensor 15–18 are processed by a signal processor 30, which applies this data to flow logic 36 executed by the signal processor 30 to determine one or more parameters of the CAF 13, such as flow velocity, volumetric flow rate and Mach number. The signal processor 30 may be one or more processing devices for executing programmed instructions, such as one or more microprocessors or application specific integrated circuits (ASICS), and may include memory for storing instructions, set points, parameters, and for buffering or otherwise storing data. For example, the signal processor 30 may be a general purpose computer.

The one or more parameters may be output as signals 21 to a display 32 or another input/output (I/O) device 34. The I/O device 34 may also accept user input parameters as may be necessary for the flow logic 36. The I/O device 34, display 32, and signal processor 30 may be mounted in a common housing, which may be attached to the sensors 15–18 by one or more wires, wireless connection, or the like. The signal processor 30 may provide operating power to the sensors 15–18 if necessary. For example, sensors 15–18 may incorporate powered amplifier circuits to amplify or otherwise condition the output signals $P_1(t)$–$P_N(t)$.

Figure 3:
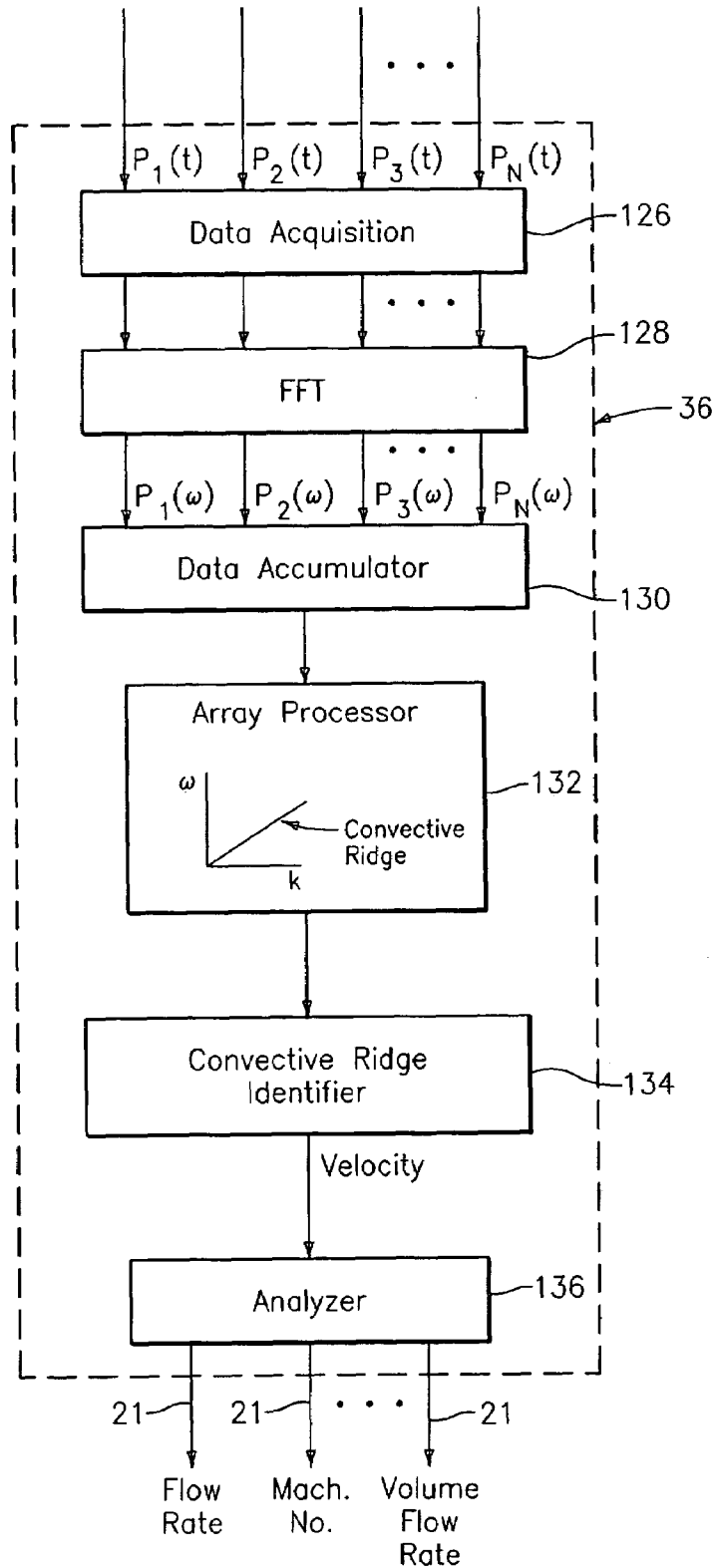
FIG. 3 is a block diagram of a first embodiment of a flow logic used in the apparatus of the present invention.

Referring to FIG. 3, an example of flow logic 36 is shown. As previously described with reference to FIG. 1, the array of at least two sensors positioned at locations $x_1,x_2$ axially along the pipe 14 sense respective stochastic signals propagating between the sensors within the pipe at their respective locations. Each sensor provides a signal indicating an unsteady pressure at its respective axial location $x_1,x_2$, at each instant in a series of sampling instants. One will appreciate that the sensor array may include two or more sensors distributed at locations $x_1 \ldots x_N$. The pressure sensors 15–18 may be clamped onto or generally removably mounted to the pipe by any releasable fastener, such as bolts, screws and clamps. Alternatively, the sensors may be permanently attached to or integral (e.g., embedded) with the pipe 14. The array of sensors may include any number of pressure sensors 15–18 greater than two sensors, such as three, four, eight, sixteen or N number of sensors between two and twenty-four sensors. Generally, the accuracy of the measurement improves as the number of sensors in the array increases. The degree of accuracy provided by the greater number of sensors is offset by the increase in complexity and time for computing the desired output parameter of the flow. Therefore, the number of sensors used is dependent at least on the degree of accuracy desired and the desire update rate of the output parameter provided by the apparatus 10. The pressure generated by the convective pressure disturbances (i.e., unsteady pressures associated with the undulations 26 of FIG. 1) may be measured through strained-based sensors and/or pressure sensors. The sensors provide analog pressure time-varying signals $P_1(t),P_2(t),P_3(t),P_N(t)$ to the flow logic 36.

The flow logic 36 processes the signals $P_1(t),P_2(t),P_3(t), P_N(t)$ to first provide output signals indicative of the pressure disturbances that convect with the CAF 13, and subsequently, provide output signals (parameters) 21, such as velocity, Mach number and volumetric flow rate of the CAF 13.

In operation, the flow logic 36 receives the pressure signals from the array of sensors 15–18. A data acquisition unit 126 (e.g., A/D converter) converts the analog signals to respective digital signals. The FFT logic 128 calculates the Fourier transform of the digitized time-based input signals $P_1(t)$–$P_N(t)$ and provides complex frequency domain (or frequency based) signals $P_1(\omega),P_2(\omega),P_3(\omega),P_N(\omega)$ indicative of the frequency content of the input signals. Instead of FFT's, any other technique for obtaining the frequency domain characteristics of the signals $P_1(t)$ –$P_N(t)$, may be used. For example, the cross-spectral density and the power spectral density may be used to form a frequency domain transfer functions (or frequency response or ratios) discussed hereinafter.

One technique of determining the convection velocity of the unsteady pressures associated with the undulations 26 within the CAF 13 is by characterizing a convective ridge of the resulting unsteady pressures using an array of sensors or other beam forming techniques, similar to that described in U.S. patent application Ser. No. 10/007,736 (Cidra's Docket No. CC-0122B) filed Nov. 8, 2002; U.S. patent application Ser. No. 09/729,994 (Cidra's Docket No. CC-0297), filed December 4, 200, now U.S. Pat. No. 6,609,069; U.S. patent application Ser. No. 10/712,833 (Cidra's Docket No. CC-0676) filed Nov. 12, 2003; and U.S. patent application Ser. No. 10/756,977 (Cidra's Docket No. CC-0700) filed Jan. 13, 2004, which are incorporated herein by reference.

A data accumulator 130 accumulates the frequency signals $P_1(\omega)$–$P_N(\omega)$ over a sampling interval, and provides the data to an array processor 132, which performs a spatial-temporal (two-dimensional) transform of the sensor data, from the xt domain to the k-ω domain, and then calculates the power in the k-ω plane, as represented by a k-ω plot.

The array processor 132 uses standard so-called beam forming, array processing, or adaptive array-processing algorithms, i.e. algorithms for processing the sensor signals using various delays and weighting to create suitable phase relationships between the signals provided by the different sensors, thereby creating phased antenna array functionality. In other words, the beam forming or array processing algorithms transform the time domain signals from the sensor array into their spatial and temporal frequency components, i.e. into a set of wave numbers given by $k=2\pi/\lambda$ where $\lambda$ is the wavelength of a spectral component, and corresponding angular frequencies given by $\omega=2\pi\upsilon$.

The prior art teaches many algorithms of use in spatially and temporally decomposing a signal from a phased array of sensors, and the present invention is not restricted to any particular algorithm. One particular adaptive array processing algorithm is the Capon method/algorithm. While the Capon method is described as one method, the present invention contemplates the use of other adaptive array processing algorithms, such as MUSIC algorithm. The present invention recognizes that such techniques can be used to determine flow rate, i.e. that the signals caused by a stochastic parameter convecting with a flow are time stationary and have a coherence length long enough that it is practical to locate sensor units apart from each other and yet still be within the coherence length.

Convective characteristics or parameters have a dispersion relationship that can be approximated by the straight-line equation, $$k=\omega/u,$$

where u is the convection velocity (flow velocity). A plot of k-ω pairs obtained from a spectral analysis of sensor samples associated with convective parameters portrayed so that the energy of the disturbance spectrally corresponding to pairings that might be described as a substantially straight ridge, a ridge that in turbulent boundary layer theory is called a convective ridge. What is being sensed are not discrete events of unsteady pressures associated with the undulations 26, but rather a continuum of possibly overlapping events forming a temporally stationary, essentially white process over the frequency range of interest. In other words, the unsteady pressures associated with the undulations 26 are distributed over a range of length scales and hence temporal frequencies.

To calculate the power in the k-ω plane, as represented by a k-ω plot (see FIG. 4) of either the signals, the array processor 132 determines the wavelength and so the (spatial) wavenumber k, and also the (temporal) frequency and so the angular frequency ω, of various of the spectral components of the stochastic parameter. There are numerous algorithms available in the public domain to perform the spatial/temporal decomposition of arrays of sensor units 15–18.

The present invention may use temporal and spatial filtering to precondition the signals to effectively filter out the common mode characteristics $P_{common\ mode}$ and other long wavelength (compared to the sensor spacing) characteristics in the pipe 14 by differencing adjacent sensors and retain a substantial portion of the stochastic parameter associated with the flow field and any other short wavelength (compared to the sensor spacing) low frequency stochastic parameters.

Figure 4:
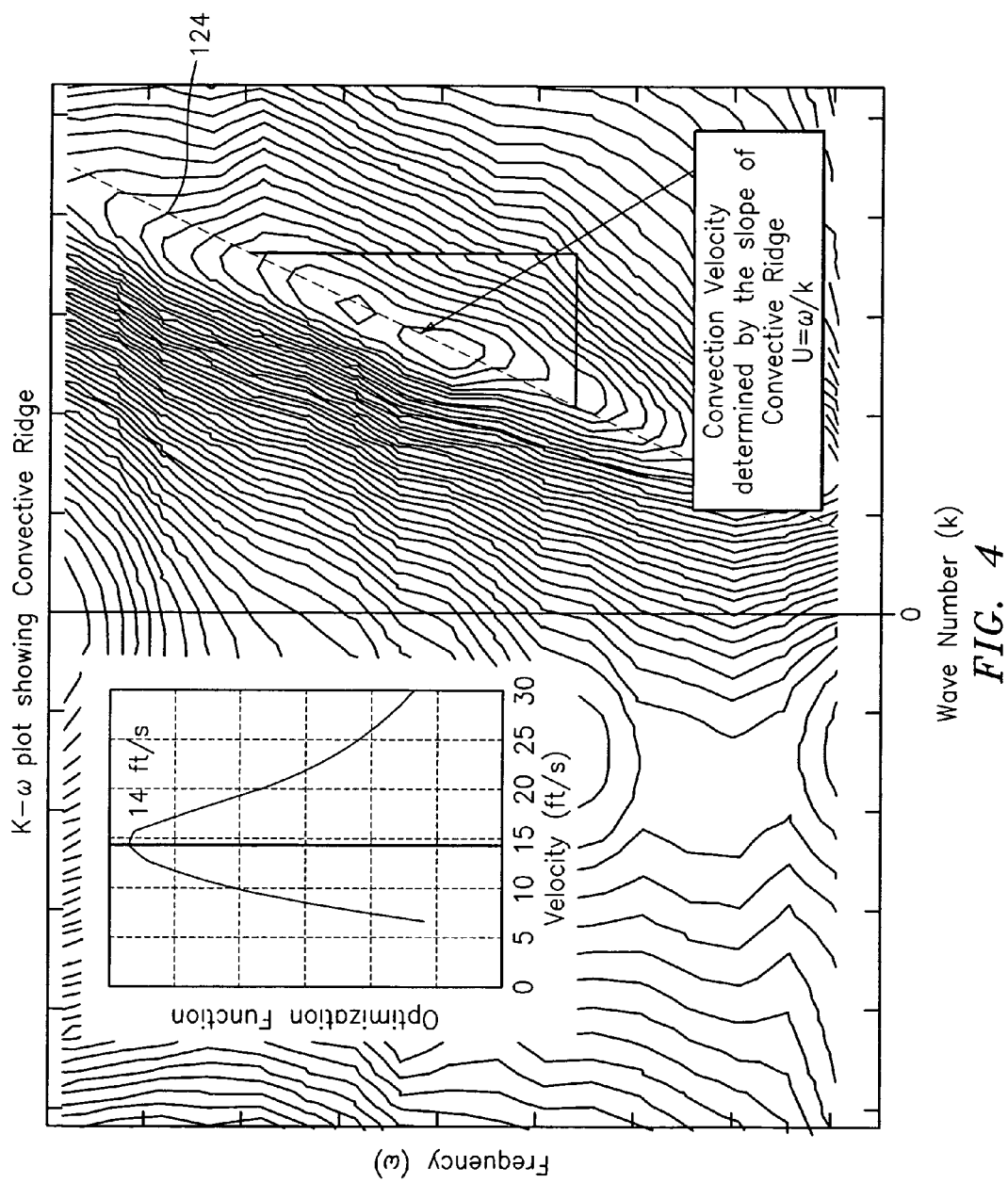
FIG. 4 a k-ω plot of data processed from an apparatus embodying the present invention that illustrates slope of the convective ridge, and a plot of the optimization function of the convective ridge, in accordance with the present invention.

In the case of suitable unsteady pressures associated with the undulations 26 being present, the power in the k-ω plane shown in a k-ω plot of FIG. 4 shows a convective ridge 124.

The convective ridge represents the concentration of a stochastic parameter that convects with the flow and is a mathematical manifestation of the relationship between the spatial variations and temporal variations described above. Such a plot will indicate a tendency for k-ω pairs to appear more or less along a line 124 with some slope, the slope indicating the flow velocity.

Once the power in the k-ω plane is determined, a convective ridge identifier 134 uses one or another feature extraction method to determine the location and orientation (slope) of any convective ridge 124 present in the k-ω plane. In one embodiment, a so-called slant stacking method is used, a method in which the accumulated frequency of k-ω pairs in the k-ω plot along different rays emanating from the origin are compared, each different ray being associated with a different trial convection velocity (in that the slope of a ray is assumed to be the flow velocity or correlated to the flow velocity in a known way). The convective ridge identifier 134 provides information about the different trial convection velocities, information referred to generally as convective ridge information.

The analyzer 136 examines the convective ridge information including the convective ridge orientation (slope). Assuming the straight-line dispersion relation given by k=ω/u, the analyzer 136 determines the flow velocity, Mach number and/or volumetric flow, which are output as parameters 21. The volumetric flow is determined by multiplying the cross-sectional area of the inside of the pipe 14 with the velocity of the CAF 13.

Some or all of the functions within the flow logic 36 may be implemented in software (using a microprocessor or computer) and/or firmware, or may be implemented using analog and/or digital hardware, having sufficient memory, interfaces, and capacity to perform the functions described herein.

Referring again to FIG. 1, the sensors 15–18 described herein may be any type of sensor, capable of measuring the unsteady (or ac or dynamic) pressures within a pipe 14, such as piezoelectric, optical, capacitive, resistive (e.g., Wheatstone bridge), accelerometers (or geophones), velocity measuring devices, displacement measuring devices, etc. If optical sensors are used, the sensors 15–18 may be Bragg grating based pressure sensors, such as that described in U.S. patent application Ser. No. 08/925,598, entitled "High Sensitivity Fiber Optic Pressure Sensor For Use In Harsh Environments", filed Sep. 8, 1997, now U.S. Pat. No. 6,016,702, and in U.S. patent application Ser. No. 10/224, 821, entitled "Non-Intrusive Fiber Optic Pressure Sensor for Measuring Unsteady Pressures within a Pipe", which are incorporated herein by reference. Alternatively, the sensors 15–18 may be electrical or optical strain gages attached to or embedded in the outer or inner wall of the pipe which measure pipe wall strain, including microphones, hydrophones, or any other sensor capable of measuring the unsteady pressures within the pipe 14. In an embodiment of the present invention that utilizes fiber optics as the pressure sensors 15–18, they may be connected individually or may be multiplexed along one or more optical fibers using wavelength division multiplexing (WDM), time division multiplexing (TDM), or any other optical multiplexing techniques.

For any of the embodiments described herein, the pressure sensors 15–18, including electrical strain gages, optical fibers and/or gratings among others as described herein, may be attached to the pipe 14 by adhesive, glue, epoxy, tape or other suitable attachment means to ensure suitable contact between the sensor and the pipe 14. The sensors 15–18 may alternatively be removable or permanently attached via known mechanical techniques such as mechanical fastener, spring loaded, clamped, clam shell arrangement, strapping or other equivalents.

Alternatively, the strain gages, including optical fibers and/or gratings, may be embedded in a composite pipe 14. If desired, for certain applications, the gratings may be detached from (or strain or acoustically isolated from) the pipe 14 if desired.

It is also within the scope of the present invention that any other strain sensing technique may be used to measure the variations in strain in the pipe 14 caused by the unsteady pressures within the pipe 14, such as highly sensitive piezoelectric, electronic or electric, strain gages attached to or embedded in the pipe 14.

In certain embodiments of the present invention, a piezoelectronic pressure transducer may be used as one or more of the pressure sensors 15–18 and it may measure the unsteady (or dynamic or ac) pressure variations inside the pipe 14 by measuring the pressure levels inside of the pipe 14. In an embodiment of the present invention, the sensors 15–18 comprise pressure sensors manufactured by PCB Piezotronics of Depew, N.Y. In one such pressure sensor there are integrated circuit piezoelectric voltage mode-type sensors that feature built-in microelectronic amplifiers, and convert the high-impedance charge into a low-impedance voltage output. Specifically, a Model 106B manufactured by PCB Piezotronics is used which is a high sensitivity, acceleration compensated integrated circuit piezoelectric quartz pressure sensor suitable for measuring low pressure acoustic phenomena in hydraulic and pneumatic systems. It has the unique capability to measure small pressure changes of less than 0.001 psi under high static conditions. The 106B has a 300 mV/psi sensitivity and a resolution of 91 dB (0.0001 psi).

The pressure sensors 15–18 may incorporate a built-in MOSFET microelectronic amplifier to convert the high-impedance charge output into a low-impedance voltage signal. The sensors 15–18 may be is powered from a constant-current source and can operate over long coaxial or ribbon cable without signal degradation. The low-impedance voltage signal is not affected by triboelectric cable noise or insulation resistance-degrading contaminants. Power to operate integrated circuit piezoelectric sensors generally takes the form of a low-cost, 24 to 27 VDC, 2 to 20 mA constant-current supply.

Most piezoelectric pressure sensors are constructed with either compression mode quartz crystals preloaded in a rigid housing, or unconstrained tourmaline crystals. These designs give the sensors microsecond response times and resonant frequencies in the hundreds of kHz, with minimal overshoot or ringing. Small diaphragm diameters ensure spatial resolution of narrow shock waves.

The output characteristic of piezoelectric pressure sensor systems is that of an AC-coupled system, where repetitive signals decay until there is an equal area above and below the original base line. As magnitude levels of the monitored event fluctuate, the output remains stabilized around the base line with the positive and negative areas of the curve remaining equal.

Furthermore the present invention contemplates that each of the pressure sensors 15–18 may include a piezoelectric sensor that provides a piezoelectric material to measure the unsteady pressures of the CAF 13. The piezoelectric material, such as the polymer, polarized fluoropolymer, polyvinylidene fluoride (PVDF), measures the strain induced within the process pipe 14 due to unsteady pressures within the pipe 14. Strain within the pipe 14 is transduced to an output voltage or current by the attached piezoelectric sensors.

The PVDF material forming each piezoelectric sensor may be adhered to the outer surface of a steel strap that extends around and clamps onto the outer surface of the pipe 14. The piezoelectric sensing element is typically conformal to allow complete or nearly complete circumferential measurement of induced strain. The sensors can be formed from PVDF films, co-polymer films, or flexible PZT sensors, similar to that described in "Piezo Film Sensors technical Manual" provided by Measurement Specialties, Inc. of Fairfield, N.J., which is incorporated herein by reference. The advantages of this technique are the following:

1. Non-intrusive flow rate measurements
2. Low cost
3. Measurement technique requires no excitation source. Ambient flow noise is used as a source.
4. Flexible piezoelectric sensors can be mounted in a variety of configurations to enhance signal detection schemes. These configurations include a) co-located sensors, b) segmented sensors with opposing polarity configurations, c) wide sensors to enhance acoustic signal detection and minimize noise detection, d) tailored sensor geometries to minimize sensitivity to pipe modes, e) differencing of sensors to eliminate acoustic noise.
5. Higher Temperatures (140C) (co-polymers)

Various other advantages of the present invention will become apparent from the examples that follow. The following examples are intended to illustrate, but in no way limit the scope of the present invention.

EXAMPLES

Figure 5:
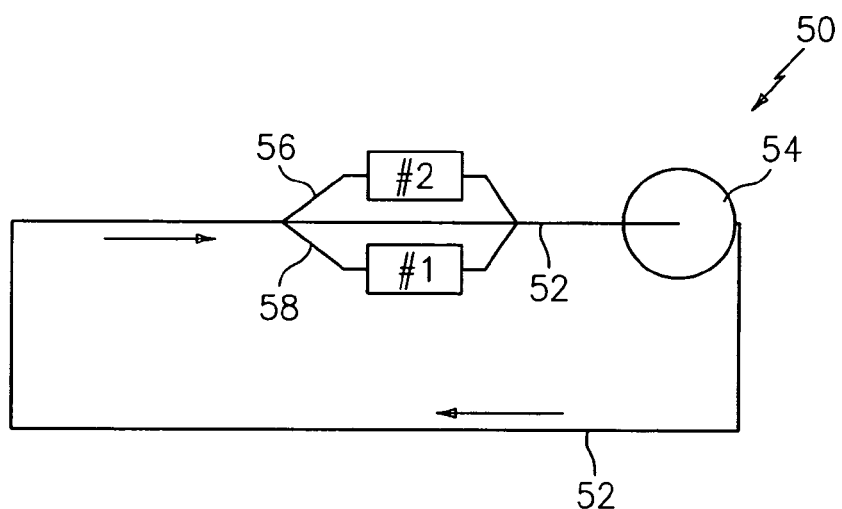
FIG. 5 depicts a test loop for the flow of bitumen froth used in testing the apparatus of the present invention.

FIG. 5 depicts a test loop 50 for the flow of bitumen froth used in testing a flow meter of the present invention. The test loop 50 includes a main loop 52 of 10 inch, schedule 10 pipe coupled to the inlet and outlet of a 300 horsepower screw pump 54. The length of the main loop 52 is approximately 100 meters. Branching from the main loop 50 proximate the inlet of the pump 54 are two bypass legs 56 and 58. Bypass leg 56 is formed from 4 inch, schedule 10 pipe and bypass leg 58 is formed from 6 inch schedule 160 pipe. The test loop 50 was filled with bitumen froth, and the pump 54 was operated to pump the bitumen froth through the test loop 50.

A series of tests was performed by attaching a flow meter embodying the present invention at various locations (locations #1 and #2) throughout the test loop 50. The flow rate of the bitumen froth was adjusted by adjusting the speed of the pump 54. The various tests are described hereinafter.

Figure 6:
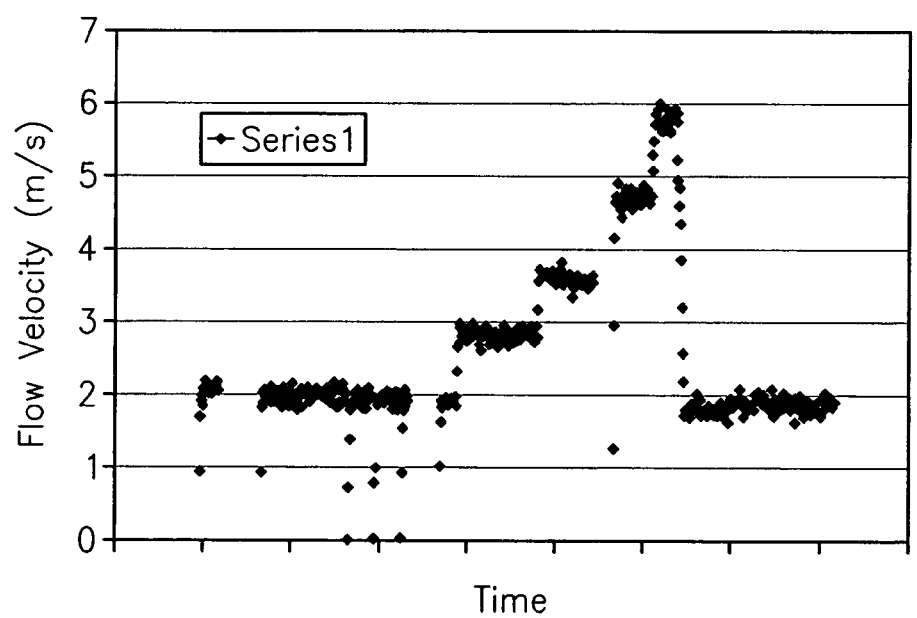
FIG. 6 is a plot of flow measurements of bitumen froth in a 6 inch, schedule 160 pipe output from the apparatus of the present invention.

In a first test, the flow meter embodying the present invention was installed at location #1 on the 6 inch, schedule 160, bypass leg 58. For approximately one hour and fifteen minutes, the flow rate of bitumen froth through the test loop 50 was varied as a function of pump 54 speed from set points of less than 2 meters-per-second (m/sec) to set points of more than 6 m/sec through bypass leg 58. The output from the meter during this testing period is shown in FIG. 6. As shown, the meter measured the step changes in flow rate of the bitumen froth. The standard deviation of the flow measurement at each set point ranged from approximately 4% at the 2 m/sec nominal flow set point to approximately 2% at the 5 m/sec nominal flow set point.

Figure 7:
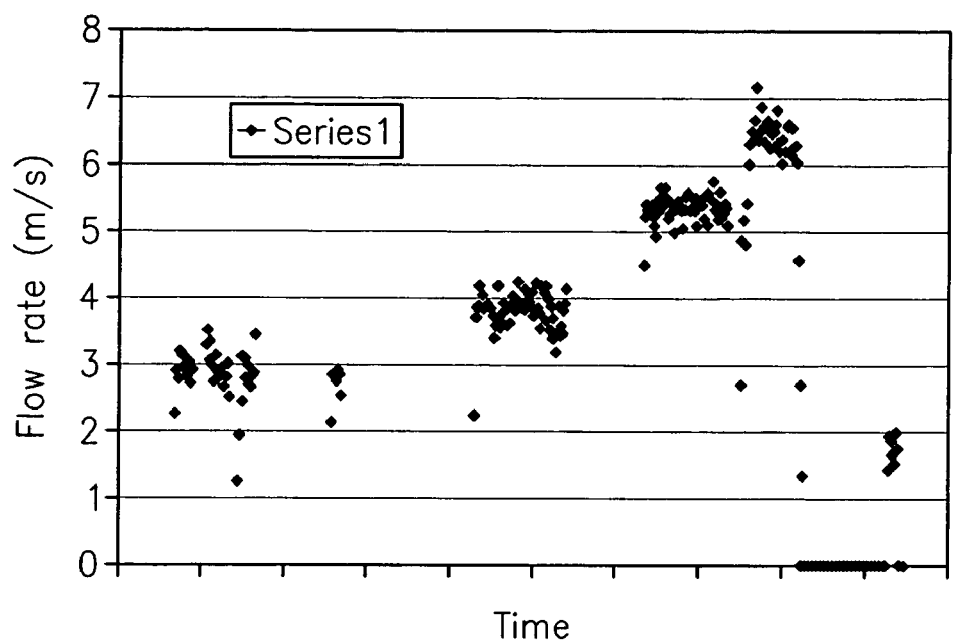
FIG. 7 is a plot of flow measurements of bitumen froth in a 4 inch, schedule 10 pipe output from the apparatus of the present invention.

In a second test, the flow meter embodying the present invention was moved to location #2 on the 4 inch, schedule 10, bypass leg 56. The meter was initially unable to obtain acceptable flow rate measurements for bitumen froth flow rates below 3 m/sec. After the bitumen froth flow rate was increased to about 3 m/sec, the flow meter began reporting flow rates. The output from the meter on the 4 inch section for a period of about one hour is shown in FIG. 7. For these conditions, the standard deviations were higher than those recorded at location #1, averaging around 5% at each set point. It is believed that the inability of the meter to obtain acceptable readings for flow rates below 3 m/sec at location #2 was due to the failure to establish NFL in the bitumen froth at these flow rates.

Figure 8:
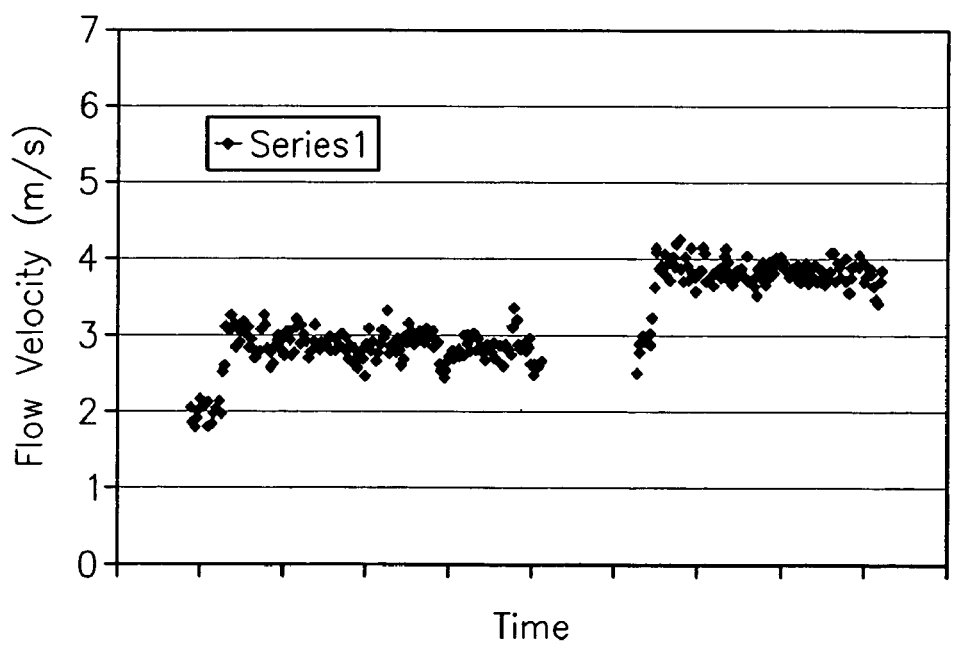
FIG. 8 is a plot of additional flow measurements of bitumen froth in a 6 inch, schedule 160 pipe output from the apparatus of the present invention.

In a third test, the flow meter embodying the present invention was re-installed onto the 6 inch line at location #1. Data was recorded for about one-half hour, verifying the performance of the meter in this location for slightly different process temperatures than those used in the earlier test at location #1. The output of the meter during this period is shown in FIG. 8. The standard deviation of the flow measurement at each set point was on the order of that obtained in the previous testing at location #1.

Figure 9:
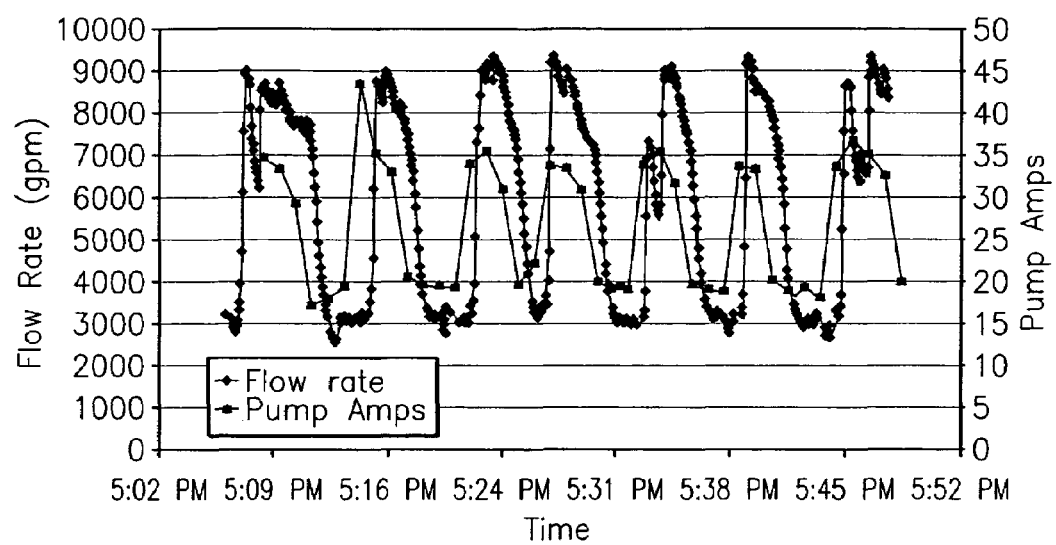
FIG. 9 is a plot of flow measurements of bitumen froth in a 16 inch froth line output from the apparatus of the present invention.

In addition to the testing performed using the test loop 50, field tests of a flow meter of the present invention were performed. In these field tests, a flow meter of the present invention was installed on a 16-inch froth line, downstream of a froth deaerator at an oilsand processing facility. The meter was installed in a vertical section of pipe with upward flow, approximately 30 ft downstream of a variable speed, centrifugal pump, used to pump the froth from the steam deaerator to a froth header. A time history of the output of the flow meter is shown in FIG. 9. As indicated by the plot of motor current in FIG. 9, the pump is being cycled on a about a 6–8 minute period, resulting in variations in the flow rate of the bitumen froth. The flow rate is cycling between about 3000 gallons per minute (gpm) and about 9000 gpm corresponding to volumetrically averaged flow velocity of about 5 feet-per-second (fps) to about 15 fps. As can be seen in FIG. 9, the time history of the flow rate determined by the flow meter is consistent with the time history of the pump motor current.

This series of tests confirms that the flow meter of the present invention effectively measures CAF such as that associated with bitumen froth. This testing also shows that the meter requires the main section of the flow loop to be operating in the CAF regime associated with NFL, supporting the hypothesis that the flow meter of the present invention senses unsteady pressures associated with the undulations (waves, bamboo waves, tiger waves, and wavy core-annular flow) formed at the interface of the core region and the annular region in the CAF.

It should be understood that any of the features, characteristics, alternatives or modifications described regarding a particular embodiment herein may also be applied, used, or incorporated with any other embodiment described herein.

It is to be understood that the above-described arrangements are only illustrative of the application of the principles of the present invention. Numerous other modifications and alternative arrangements may be devised by those skilled in the art without departing from the spirit and scope of the present invention, and the appended claims are intended to cover such modifications and arrangements.

What is claimed is:

1. An apparatus for measuring at least one parameter associated with a core-annular flow in a pipe, the apparatus comprising:
    a spatial array of at least two pressure sensors disposed at different axial locations along the pipe, with each of the at least two pressure sensors providing a pressure signal indicative of unsteady pressure within the pipe at a corresponding axial location of the pipe, the unsteady pressure being associated with undulations formed at the interface of a core region and an annular region in the core-annular flow; and
    a signal processor configured to process the pressure signals to define a convective ridge in the k-ω plane, and determine the slope of at least a portion of the convective ridge to determine a flow velocity of the core-annular flow.

2. The apparatus of claim 1, wherein the core-annular flow is developed from a shear thinning fluid.

3. The apparatus of claim 2, wherein the shear thinning fluid includes bitumen froth.

4. The apparatus of claim 1, wherein the core-annular flow is developed from a lubricating fluid and a fluid to be transported, the fluid to be transported forming the core region and the lubricating fluid forming the annular region.

5. The apparatus of claim 4, wherein the lubricating fluid includes water and the fluid to be transported includes oil.

6. The apparatus of claim 1, wherein the core-annular flow is developed from a wood pulp fiber suspension.

7. The apparatus of claim 1, wherein the signal processor is further configured to:
    determine a cross-sectional area of the pipe; and
    determine the volumetric flow rate of the core-annular flow using the cross-sectional area and the flow velocity of the core-annular flow.

8. The apparatus of claim 1, wherein at least one of the sensors measures strain on the pipe.

9. The apparatus of claim 1, wherein spatial array of sensors include at least three sensors disposed at different axial locations along the pipe.

10. The apparatus of claim 1, wherein spatial array of sensors include at least 4–16 sensors disposed at different axial locations along the pipe.

11. The apparatus of claim 10, wherein the signal processor uses an array processing algorithm to determine the flow velocity.

12. The apparatus of claim 1, wherein the pressure sensors are clamped on the outer surface of the pipe.

13. A method for measuring at least one parameter associated with a core-annular flow in a pipe, the method comprising:
    sensing unsteady pressures associated with undulations formed at the interface of a core region and an annular region in the core-annular flow at different axial locations along the pipe to provide signals indicative of the unsteady pressures; and
    processing the signals indicative of the unsteady pressures to define a convective ridge in the k-ω plane, and determining the slope of at least a portion of the convective ridge to determine a flow velocity of the core-annular flow.

14. The method of claim 13, wherein the core-annular flow is developed from a shear thinning fluid.

15. The method of claim 14, wherein the shear thinning fluid includes bitumen froth.

16. The method of claim 13, wherein the core-annular flow is developed from a lubricating fluid and a fluid to be transported, the fluid to be transported forming the core region and the lubricating fluid forming the annular region.

17. The method of claim 16, wherein the lubricating fluid includes water and the fluid to be transported includes oil.

18. The method of claim 13, wherein the core-annular flow is developed from a wood pulp fiber suspension.

19. The method of claim 13, wherein determining the at least one parameter includes:
    determining a cross-sectional area of the pipe; and
    determining the volumetric flow rate of the core-annular flow using the cross-sectional area and the flow velocity of the core-annular flow.

20. The method of claim 13, wherein sensing the unsteady pressures includes measuring strain on the pipe.

21. The method of claim 13, wherein sensing unsteady pressures include measuring unsteady pressures at at least two different axial locations along the pipe.

22. The method of claim 13, wherein sensing unsteady pressures include measuring unsteady pressures at at least three different axial locations along the pipe.

23. The method of claim 13, wherein sensing unsteady pressures include measuring unsteady pressures at at least 4 to 16 different axial locations along the pipe.

24. The method of claim 23, wherein the processing the signals includes using an array processing algorithm to determine the flow velocity.

25. An apparatus for measuring at least one parameter associated with a core-annular flow in a pipe, the apparatus comprising:
    a spatial array of at least two pressure sensors disposed at different axial locations along the pipe, with each of the at least two pressure sensors providing a pressure signal indicative of unsteady pressure within the pipe at a corresponding axial location of the pipe, the unsteady pressure being associated with undulations formed at the interface of a core region and an annular region in the core-annular flow; and a signal processor configured to determine a cross-sectional area of the pipe, and determine the flow velocity of the core-annular flow in response to the pressure signals and the volumetric flow rate of the core-annular flow using cross-sectional area and the flow velocity.

26. The apparatus of claim 25, wherein at least one of the sensors measures strain on the pipe.

27. The apparatus of claim 25, wherein spatial array of sensors include at least three sensors disposed at different axial locations along the pipe.

28. The apparatus of claim 25, wherein spatial array of sensors include at least 4–16 sensors disposed at different axial locations along the pipe.

29. The apparatus of claim 28, wherein the signal processor uses an array processing algorithm to determine the flow velocity.

30. The apparatus of claim 25, wherein the pressure sensors are clamped on the outer surface of the pipe.

31. A method for measuring at least one parameter associated with a core-annular flow in a pipe, the method comprising:

sensing unsteady pressures associated with undulations formed at the interface of a core region and an annular region in the core-annular flow at different axial locations along the pipe to provide signals indicative of the unsteady pressures;

determining a cross-sectional area of the pipe;

determining the velocity of the core-annular flow in response to the pressure signals, and determining the volumetric flow rate of the core-annular flow using the cross-sectional area of the pipe and the flow velocity of the core-annular flow.

32. The method of claim 31, wherein sensing the unsteady pressures includes measuring strain on the pipe.

33. The method of claim 31, wherein sensing unsteady pressures include measuring unsteady pressures at at least two different axial locations along the pipe.

34. The method of claim 31, wherein sensing unsteady pressures include measuring unsteady pressures at at least three different axial locations along the pipe.

35. The method of claim 31, wherein sensing unsteady pressures include measuring unsteady pressures at at least 4 to 16 different axial locations along the pipe.

36. The method of claim 35, wherein the processing the signals includes using an array processing algorithm to determine the flow velocity.

* * * * *